United States Patent [19]
Billingsley et al.

[11] 4,368,928
[45] Jan. 18, 1983

[54] INERTIAL HAND BRAKE RELEASE APPARATUS

[75] Inventors: Robert H. Billingsley, St. Louis; Steven L. Jantzen, St. Charles; James R. Zimmerle, O'Fallon, all of Mo.

[73] Assignee: ACF Industries, Incorporated, New York, N.Y.

[21] Appl. No.: 261,404

[22] Filed: May 7, 1981

[51] Int. Cl.³ .............................................. B60T 15/36
[52] U.S. Cl. ......................................... 303/18; 303/2; 303/71
[58] Field of Search .................... 188/107, 197, 216; 303/2, 18, 22 R, 24 R, 68, 71

[56] References Cited

U.S. PATENT DOCUMENTS

| | | | |
|---|---|---|---|
| 3,891,277 | 6/1975 | Cope | 303/2 |
| 3,974,899 | 8/1976 | Mita et al. | 303/71 X |
| 3,982,794 | 9/1976 | Colovas et al. | 303/71 X |
| 4,033,629 | 7/1977 | Spalding | 303/2 |
| 4,166,513 | 9/1979 | Johnson | 303/71 X |

Primary Examiner—Duane A. Reger
Attorney, Agent, or Firm—Henry W. Cummings

[57] ABSTRACT

Apparatus (1) for automatically releasing a railroad car hand brake (HB) normally maintained in its applied position. An air pressure activated piston (11) acts on a hand brake release (5) to release the hand brake. An air conduit (13) directs pressurized air from a pressurized air source to the air cylinder. A normally closed first valve (25) is connected in the air conduit between the source and the air cylinder. A normally closed second valve (29) is connected in the air conduit between the source and a control inlet of the first valve. A sensor (33) senses an inertial load on the car and opens the second valve when the inertial load sensed exceeds a predetermined acceleration factor. Air pressure directed to the control inlet of the first valve through the second valve, when it is open, opens the first valve if the air pressure level is sufficiently great to release the air brakes of the car. The hand brake is released only if source pressure is sufficiently high and the inertial load sensed exceeds the acceleration factor.

10 Claims, 2 Drawing Figures

INERTIAL HAND BRAKE RELEASE APPARATUS

BACKGROUND OF THE INVENTION

This invention relates to brake release mechanisms for railroad cars and more specifically to a mechanism for automatically releasing a railroad car hand brake upon movement of the car.

Movement of a rail car with hand brake applied can result in putting flat spots on the wheels of the car, possible derailment of the car or damage to trucks and brakes of the car. Prior attempts have been made to address this problem. U.S. Pat. No. 591,666, issued Oct. 12, 1897, discloses a lever connected to a piston movable by a brake cylinder to which air is supplied. Movement of this lever produces movement of a brake rod which, in turn, moves a second lever to disconnect a pawl from a ratchet wheel. Such an arrangement might be utilized with a rail car hand brake. U.S. Pat. No. 591,667, issued on the same date, discloses an angle cock which is opened to connect a train line to a railroad car. The cock has a handle which, when turned to open the cock, causes movement of a linkage which disconnects a pawl from a handbrake ratchet thus releasing the brake. U.S. Pat. No. 3,891,277, issued June 24, 1975, discloses an actuating valve to which air is directed. The valve has a piston movable by air pressure to open an outlet through which air is directed to a handbrake release cylinder.

The mechanisms described in these patents do produce release of a railroad car handbrake when the car's air brakes are released by trainline pressure or it is sensed that the trainline is connected. There are, however, situations where the trainline is connected and the airbrakes are released, but it is still necessary to keep the hand brake applied. Such a situation occurs, for example, where a train is assembled and the air brakes tested before the locomotive is connected.

SUMMARY OF THE INVENTION

Among the several objects of the present invention may be noted the provision of apparatus for automatically releasing a railroad car hand brake; the provision of such apparatus for automatically releasing the hand brake only when train line air pressure is sufficiently high to release the air brakes on the car, at the same time, is subjected to a sufficiently great inertial force; the provision of such apparatus which quickly and easily releases the hand brake when the stated conditions simultaneously exist, and the provision of such apparatus for maintaining the hand brake applied when the car is subjected to a static load.

Briefly, apparatus of the present invention is for automatically releasing a railroad car hand brake. A hand brake is normally maintained in its applied position. An air pressure activated unit acts on a hand brake release to force release of the hand brake. An air conduit directs pressurized air from a pressurized air source to the air pressure activated unit. A normally closed first valve is connected in the air conduit between the source and the air pressure activated unit. A normally closed second valve is connected in the air conduit between the source and a control inlet of the first valve. An inertial load on the car is sensed and the second valve is opened when the sensed inertial load exceeds a predetermined acceleration factor. Air pressure is directed to the control inlet of the first valve through the second valve when it is open. This opens the first valve if the air pressure level is sufficiently great to release the air brakes of the car. Opening of the first valve causes the air pressure activated unit to release the hand brake. The hand brake is released only if source pressure is sufficiently high and the inertial load sensed exceeds the acceleration factor. Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF PREFERRED EMBODIMENTS

Figures 1, 2:
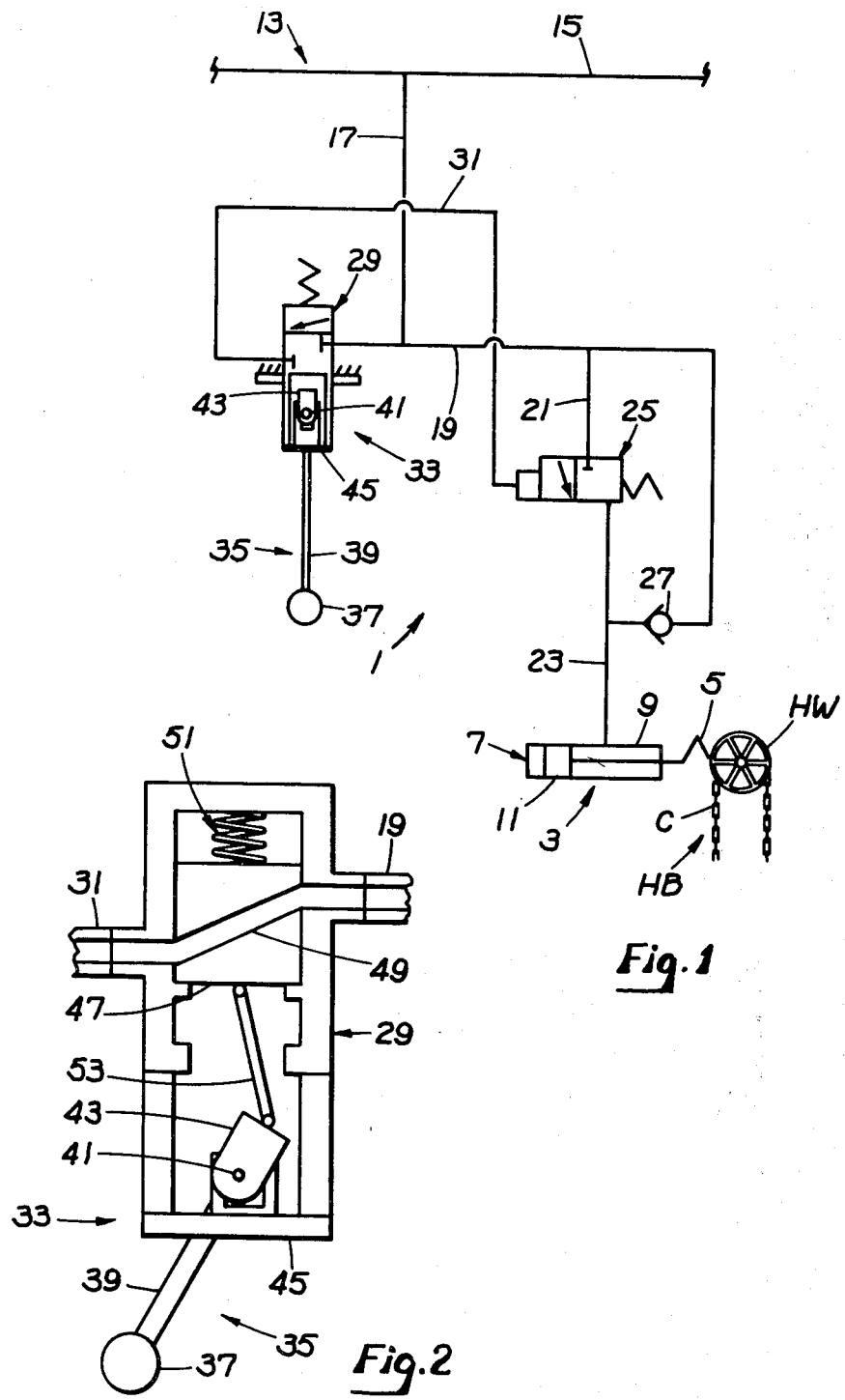
FIG. 1 is a schematic representation of an inertial hand brake release mechanism of the present invention.
FIG. 2 is a sectional view of a portion of a valve of the apparatus illustrating operation of the apparatus for opening the valve.

Referring to the drawings, apparatus of the present invention is indicated generally 1 in FIG. 1 and is for automatically releasing a hand brake HB on a railroad car (not shown). The hand brake is used to prevent movement of the car in a rail yard or similar location and is separate from the air braking system with which the car is equipped for stopping the car when it is part of a moving train. Typically, hand brake HB includes a hand wheel HW and a drive chain C which engages the hand wheel to torn the wheel or be moved by turning the wheel.

Apparatus 1 includes a hand brake release means 3 comprising a lever 5, one end of which engages hand wheel HW to prevent the wheel from turning. An air pressure activator means 7 includes an air cylinder 9 having a piston 11 movable in the cylinder. The other end of lever 5 is attached to piston 11 and application of air pressure to the backside of the piston moves it to the left as viewed in FIG. 1. This, in turn, moves the lever out of engagement with hand wheel HW thereby releasing hand brake HB.

An air conduit 13 directs pressurized air from an air source (not shown) to air cylinder 9. Air conduit 13 includes a train line 15 which extends the length of a train and is comprised of individual conduit sections for each car which are coupled together throughout the length of the train. Train line 15 is used to direct air to the air brakes on each railroad car to stop the train. Pressurized air is directed from train line 15 to air cylinder 9 via conduits 17, 19, 21 and 23. Conduit 17 extends from train line 15 and makes a tee connection with conduit 19. Conduit 21 is also tee connected with line segment 19 and extends to the inlet of a normally closed first or master valve 25. Conduit 23 extends from the outlet of valve 25 to air cylinder 9. A check valve 27 is connected between line segment 19 and line segment 23 to allow piston 11 to retract when train line pressure is dropped to 0.

A normally closed second or pilot valve 29 has its inlet connected to one arm of conduit 19. The outlet of valve 29 is connected to a control inlet of master valve 25 via an air conduit 31. If pilot valve 29 is open, pressurized air is delivered to the control inlet of master valve 25, and if the air pressure level is sufficiently high, master valve 25 opens and permits flow of pressurized air from train line 15 to air cylinder 9. Master valve 25 is biased closed, but opens if the air pressure level is high enough to release the air brakes on the railroad car if applied to the air brakes.

A means 33 senses an inertial load to which the railroad car is subjected and acts to open pilot valve 29 when the inertial load exceeds a predetermined value, for example, 0.5 g, where g represents gravitational acceleration. As shown in FIGS. 1 and 2, inertial load sensing means 33 includes a mechanical sensing means 34 including pendulum 35 comprising a weight 37 at one end of a rod 39 with the other end of the rod being pivoted at 41 for reciprocal movement of the pendulum. Rod 39 is hingedly attached to a U-joint 43 and extends through a swash plate 45 having an appropriate slot therein.

As shown in FIG. 2, pilot valve 29 includes a movable block 47 having an air passage 49 therethrough. When the block is properly positioned, air passage 49 provides communication between the inlet and outlet of the pilot valve and air is directed through the valve. A bias means 51 comprises a spring pulling block 47 upwardly in a valve 29 closing direction. A rod 53 is attached both to the bottom of block 47 and U-joint 43. As the pendulum swings, the U-joint rotates and rod 53 pulls the block downwardly against the force of the spring. If the inertial load on the railroad car is great enough, the swing of pendulum 35 moves U-joint 43 in a large enough arc so block 47 is moved to the pilot valve opening position shown in FIG. 2.

In operation, if inertial load sensing means 33 senses an inertial load greater than the predetermined value, pilot valve 29 is opened in the manner described above. Pressurized air is now directed through valve 29 to the control inlet of master valve 25 which is closed. If the air pressure level in train line 15 is sufficiently high, the air pressure at the control inlet of master valve 25 is sufficient to open the valve and train line air is directed through the master to air cylinder 9 to release hand brake HB. If train line pressure is sufficiently high, but the sensed inertial load is below the predetermined valve, pilot valve 29 remains closed and master valve 25 cannot open. If, the sensed inertial load is great enough so pilot valve 29 is opened by load sensing means 33, but train line pressure is not high enough to release the air brakes, the air pressure level at the control inlet of master valve 25 is too low to open the valve. In either case, pressurized air is not directed to air cylinder 9 and hand brake HB is not released. Hand brake HB is released only when both operation conditions are simultaneously met; i.e. sufficiently high train line pressure and sufficiently great inertial load on the railroad car. Otherwise, the hand brake remains applied. Under static conditions, hand brake HB remains applied even though the air brakes of the car are released and the car is subjected to minor jostling. Normal train action, however, results in the inertial load on the car quickly exceeding the predetermined inertial load value with pilot valve 29 and master valve 25 both being opened and hand brake HB being released. Master valve 25 once opened remains open until train line pressure is reduced to zero and does not interfere with normal operation of the hand brake.

In view of the above, it will be seen that the several objects of the invention are achieved and other advantageous results obtained.

As various changes could be made in the above constructions without departing from the scope of the invention, it is intended that all matter contained in the above description and shown in the accompanying drawing shall be interpreted as illustrative and not in a limiting sense.

What is claimed is:

1. Apparatus for automatically releasing a railroad car hand brake comprising:
 hand brake release means normally maintaining the hand brake in its applied position; air pressure activated means acting on the release means to force the release means to release the hand brake; an air conduit directing pressurized air from a pressurized air source to the air pressure activated means; a normally closed first valve means connected in the air conduit between the source and the air pressure activated means; a normally closed second valve means connected in the air conduit between the source and a control inlet of the first valve means; means for sensing an inertial load on the car and for opening the second valve means when the inertial load sensed exceeds a predetermined value, opening of the second valve means causing the first valve means to open; air pressure directed to the control inlet of the first valve means through the second valve means, when said second valve means is open opening the first valve means if the air pressure level is sufficiently great to release the air brakes of the car; and the air pressure activated means to force the release means to release the hand brake whereby the hand brake is released only if source pressure is sufficiently high and the inertial load sensed exceeds the acceleration factor.

2. Apparatus as set forth in claim 1 wherein the inertial loading sensing means is a mechanical assembly.

3. Apparatus as set forth in claim 1 wherein the inertial load sensing means is a pendulum.

4. Apparatus as set forth in claim 3 wherein the second valve means includes a valve member movable from a first position closing the second valve to a second position opening the second valve and means biasing the valve member to its first position, the valve member being movable by the pendulum, when the inertial load on the car is sufficiently high, from its first to its second position thereby opening the second valve.

5. Apparatus as set forth in claim 1 wherein the hand brake release means includes a lever, one end of which contacts the hand brake and prevents movement thereof.

6. Apparatus as set forth in claim 5 wherein the air pressure activated means includes an air cylinder and a piston movable in the cylinder when air pressure is applied thereto.

7. Apparatus as set forth in claim 6 wherein the other end of the lever is attached to the piston for the piston to move the lever when air pressure is applied to the cylinder, movement of the lever by the piston when air pressure is applied to the cylinder pulling the one end of the lever away from the hand brake, thereby releasing the hand brake.

8. Apparatus as set forth in claim 7 wherein the inertial load sensing means comprises a mechanical assembly.

9. Apparatus as set forth in claim 8 wherein the inertial load sensing means includes a pendulum.

10. Apparatus as set forth in claim 9 wherein the second valve means includes a valve member movable from a first position closing the second valve to a second position opening the second valve and means biasing the valve member to its first position, the valve member being movable by the pendulum, when the inertial load on the car is sufficiently high, from its first to its second position thereby opening the second valve.

* * * * *